US010565586B2

(12) United States Patent
Roche et al.

(10) Patent No.: US 10,565,586 B2
(45) Date of Patent: Feb. 18, 2020

(54) ELECTRONIC PAYMENT PROCESSING METHOD AND SYSTEM WITH SMART/AUTHENTICATE FIELDS AND DEFINITIONS

(75) Inventors: Michael Roche, University Heights, OH (US); Adam Ratica, Mentor, OH (US); Phillip Romano, Concord Township, OH (US); Matthew Yucha, Mentor, OH (US); Scott Rauhe, Lakewood, OH (US)

(73) Assignee: CardinalCommerce Corporation, Mentor, OH (US)

( * ) Notice: Subject to any disclaimer, the term of this patent is extended or adjusted under 35 U.S.C. 154(b) by 480 days.

(21) Appl. No.: 13/016,283

(22) Filed: Jan. 28, 2011

(65) Prior Publication Data
US 2011/0218879 A1 Sep. 8, 2011

Related U.S. Application Data

(60) Provisional application No. 61/317,425, filed on Mar. 25, 2010, provisional application No. 61/299,390, filed on Jan. 29, 2010.

(51) Int. Cl.
*G06Q 20/38* (2012.01)
*G06Q 20/40* (2012.01)
*G06Q 20/04* (2012.01)

(52) U.S. Cl.
CPC .......... *G06Q 20/382* (2013.01); *G06Q 20/04* (2013.01); *G06Q 20/405* (2013.01);
(Continued)

(58) Field of Classification Search
CPC ............................................ G06Q 20/00–425
(Continued)

(56) References Cited

U.S. PATENT DOCUMENTS 7,051,002 B2 5/2006 Keresman, III et al.
7,231,657 B2 6/2007 Honarvar et al.
(Continued)

FOREIGN PATENT DOCUMENTS

JP 20036548 A 1/2003
JP 2006-004448 1/2006
(Continued)

OTHER PUBLICATIONS

International Search Report dated Apr. 8, 2011.
Japan Office Action dated Mar. 3, 2015, including English translation.

*Primary Examiner* — Mohammad A. Nilforoush
(74) *Attorney, Agent, or Firm* — The Webb Law Firm (57) ABSTRACT

A method and corresponding system for supporting authentication processing of commercial transactions conducted over a communications network between consumers and merchants. Payment information for a commercial transaction between a consumer and a merchant is received over the communications network. The payment information identifies a payment instrument supporting an authenticated payment program. A determination is made as to whether to authenticate the consumer using the authenticated payment program based on authentication criteria defined by the merchant. The consumer is authenticated over the communications network in accordance with the authenticated payment program if authentication is determined to be appropriate based on the authentication criteria defined by the merchant.

9 Claims, 6 Drawing Sheets

(52) U.S. Cl.
    CPC ....... *G06Q 20/409* (2013.01); *G06Q 20/4014* (2013.01); *G06Q 20/4016* (2013.01)

(58) Field of Classification Search
    USPC .................................................. 705/50–912
    See application file for complete search history.

(56) References Cited

U.S. PATENT DOCUMENTS

| | | | |
|---|---|---|---|
| 2002/0099649 A1* | 7/2002 | Lee ........................ | G06Q 20/04 705/38 |
| 2002/0111916 A1* | 8/2002 | Coronna ................ | G06Q 20/00 705/64 |
| 2002/0116333 A1* | 8/2002 | McDonnell et al. ........... | 705/40 |
| 2003/0233327 A1* | 12/2003 | Keresman et al. ............. | 705/44 |
| 2004/0117302 A1* | 6/2004 | Weichert et al. ............... | 705/40 |
| 2006/0282382 A1 | 12/2006 | Balasubramanian et al. | |
| 2007/0175992 A1* | 8/2007 | Brown ......................... | 235/385 |
| 2008/0086759 A1 | 4/2008 | Colson | |
| 2008/0140576 A1 | 6/2008 | Lewis et al. | |
| 2008/0162295 A1 | 7/2008 | Bedier | |
| 2009/0138367 A1 | 5/2009 | Okawa | |

FOREIGN PATENT DOCUMENTS

| | | |
|---|---|---|
| JP | 2007-514333 | 5/2007 |
| WO | WO 2005/025292 | 3/2005 |
| WO | 2006082913 A1 | 8/2006 |

\* cited by examiner

ELECTRONIC PAYMENT PROCESSING METHOD AND SYSTEM WITH SMART/AUTHENTICATE FIELDS AND DEFINITIONS

This application claims the benefit of both U.S. Provisional Application No. 61/317,425, filed Mar. 25, 2010, and U.S. Provisional Application No, 61/299,390, filed Jan. 29, 2010, incorporated herein by reference in their entireties.

BACKGROUND

The present exemplary embodiments relate generally to e-commerce. They find particular application in conjunction with payment brand selection and/or consumer authentication, to conduct a commercial transaction over a communications network (e.g., the Internet), and will be described with particular reference thereto. However, it is to be appreciated that the present exemplary embodiments are also amenable to other like applications.

By way of background, Internet commerce, or e-commerce as it is otherwise known, relates to the buying and selling of products and/or services between consumers and merchants over the Internet or other like transactional exchanges of information. The convenience of shopping over the Internet has sparked considerable interest in e-commerce on behalf of both consumers and merchants. Internet sales, or like transactions, have been typically carried out using standard credit cards, for example, from Visa®, MasterCard®, Discover®, American Express®, or the like, or standard debit cards, such as check cards or automated teller machine (ATM) cards which directly access funds from an associated deposit account or other bank account.

Figure 1:
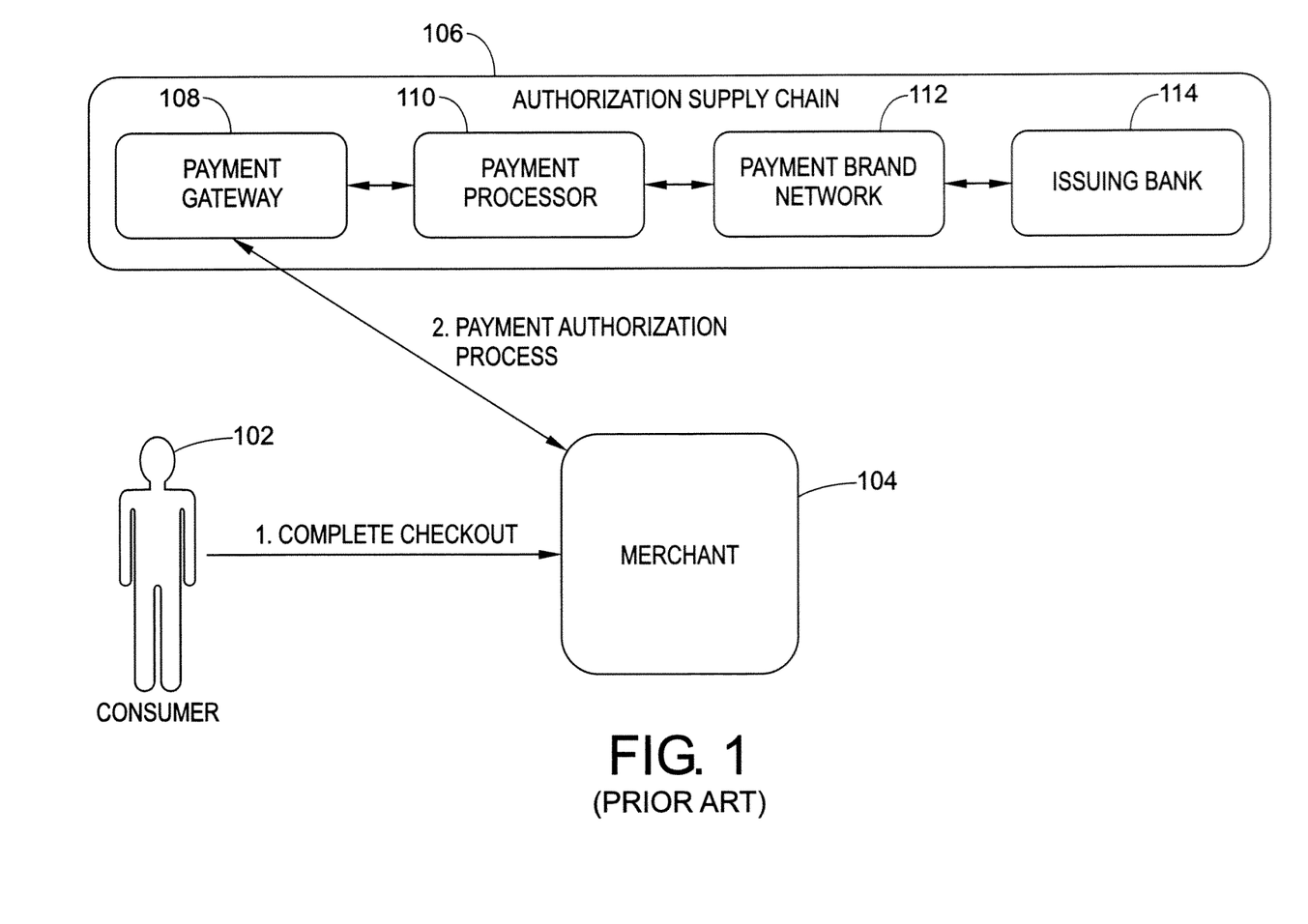
FIG. 1 is a schematic diagram of a payment process without an authenticated payment program.

FIG. 1 illustrates one example of an authorization process for an e-commerce transaction. When a consumer 102 seeks to purchase a product and/or service from a merchant 104, they complete a checkout process in which they typically provide the merchant 104 with payment information, or at least enough information to identify and/or locate payment information. Payment information typically identifies a payment instrument, such as a credit card, associated with a payment brand. Upon receiving the payment information, the merchant 104 authorizes the transfer of funds using an authorization supply chain 106. The authorization supply chain 106 typically includes an optional payment gateway 108, a payment processor 110 (e.g., the merchant's financial institution or acquiring bank), a payment brand network 112, an issuing bank 114, and the like. In certain embodiments, the merchant 104 connects directly with the payment processor 110, whereby the payment gateway 108 is optional.

While widely used for more traditional face-to-face transactions, use of these standard cards in connection with e-commerce presents certain difficulties, including difficulties concerning authentication or positive identification of the cardholder. For example, maintaining consumer confidence in security has become difficult with increased reports of fraud. The resulting apprehension is also fueled by consumer uncertainty of the reputation and/or integrity of a merchant with whom the consumer is dealing. Questionable security of the consumer's card information or other personal information (e.g., address, card number, phone number, and the like) typically submitted along with a traditional e-commerce transaction serves to increase apprehension even more. Additionally, cardholders, merchants and financial institutions are all concerned about safeguarding against fraudulent or otherwise unauthorized transactions.

Figure 2:
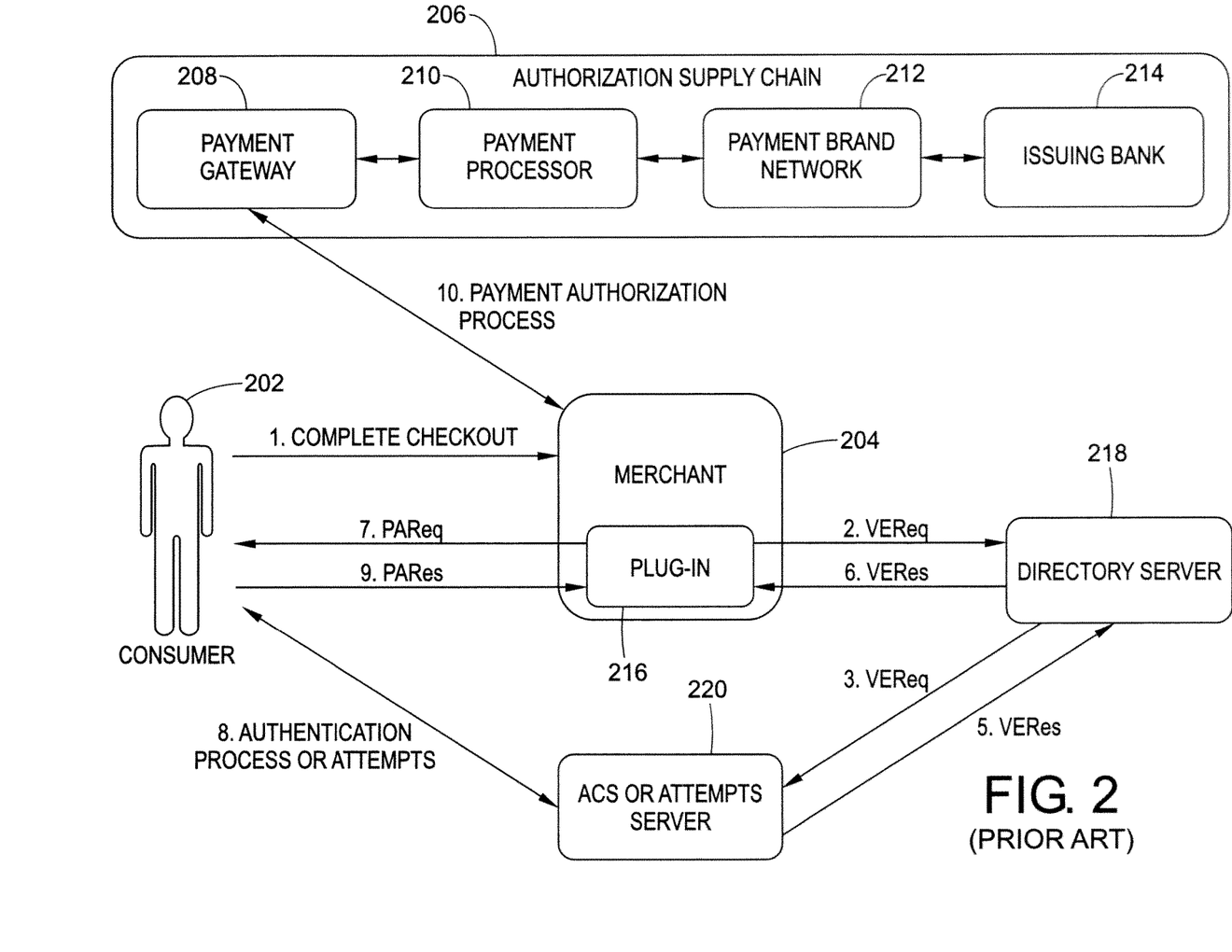
FIG. 2 is a schematic diagram of a payment process incorporating an authenticated payment program.

Accordingly, various payment brand networks have implemented programs (or initiatives) aimed at safeguarding against fraud. For example, Visa® and MasterCard® both support authentication programs in which the bank or financial institution issuing the card (i.e., the issuing bank) authenticates a cardholder. FIG. 2 illustrates one such exemplary authentication program. As shown, a consumer 202 (e.g., employing a suitable web browser or the like) attempts to purchase products and/or services (e.g., over the Internet) from a merchant 204. As is known in the art, the illustrated authorization supply chain 206 includes an optional payment gateway 208, a payment processor 210, a payment brand network 212, and an issuing bank 214.

At a point of checkout, the consumer 202 selects an appropriate payment method based on the authentication programs supported by the merchant 204. At this point, the consumer 202 fills out an on-line checkout form including a payment instrument, a card number, an expiration date, etc. Based on the payment information, the merchant 204, via a plug-in 216 installed on their servers, passes a verify enrollment request (VEReq) message to a directory server 218 suitably operated by the payment brand network 212. The directory server 218 includes a database associating participating merchants with their payment processor and a database associating card number ranges with locations or addresses (e.g., universal resource locator (URL) addresses) of issuing banks access control servers (ACSs). The VEReq message is a request to verify the enrollment of the card in the authentication program, and it contains the card number provided by the consumer 202.

Based on the card number range stored within the directory server 218, the VEReq message is sent to an ACS or attempts server 220. If the consumer and/or the issuing bank do not participate in a payment program, the VEReq message is sent to an attempts server typically operated by the payment brand network 212. Otherwise, the VEReq message is sent to the appropriate URL address for the issuing bank's ACS server. In either case, a response (i.e., a verify enrollment response (VERes)) to the VEReq message is returned to the merchant 204 via the directory server 218. That is to say, the ACS or attempts server 220 responds with a VERes message to the directory server 238, which is then passed back to the plug-in 216. Where the ACS or attempts server 220 is an ACS, the enrollment status of the card is also verified.

Based on the VERes message (i.e., if positive), the plug-in 216 redirects the consumer's browser to the ACS or attempts server 220 by passing it a payer authentication request (PAReq) message generated by the plug-in 216. The consumer 202 then completes an authentication process or attempts directly with the ACS or attempts server 220. The ACS or attempts server 220 authenticates the consumer 202, if applicable, and responds to the merchant 204 with a payer authentication response (PARes) message, including a digital signature. The plug-in 206 validates the digital signature of the PARes and extracts the authentication status and other specified data that is to be used by the merchant 204 during the payment authorization process carried out via the authorization supply chain 206. For example, the merchant 204 sends an authorization and/or sale transaction to their payment gateway 208 along with the data elements received from the PARes. The payment gateway 208 routes the data to the payment processor 210 based on the payment processor's specification. The payment processor 210 then sends the data via the appropriate payment brand network 212 to the issuing bank 214 for settlement.

With industry momentum swinging in the direction of authentication of consumers, more and more merchants are implementing authenticated payment programs, such as the aforementioned example, for the first time. With these initial implementations, merchants run the risk of introducing an authenticated payment program in a way that could disrupt their current checkout process. Further, merchants are responsible for remaining current with program protocols that can change periodically. That is to say, as the authentication protocols are updated and/or changed by the respective payment brand networks, the merchants are responsible for updating and/or changing their plug-ins to reflect those updates and/or changes being mandated by the payment brand networks.

Even more, when using authentication programs, the payment brand networks often ensure participating merchants that fraudulent transactions and other charge backs, as they are known in the art, will not be the merchants' responsibility provided the specified protocols have been followed. However, there are considerable burdens placed upon the merchants to participate in the authentication programs. For example, typical installation of the merchant plug-in can be overly burdensome using up resources (e.g., computing power, memory, data storage capacity, etc.) the merchant would otherwise prefer to devote to other tasks. Often, the plug-in can be extremely large and/or cumbersome to implement on the merchant's server. Moreover, for a merchant that participates in a plurality of such authentication programs for multiple payment brand networks, the burden can be that much more (i.e., requiring a separate plug-in for each individual authentication program they wish to support), especially considering that each payment brand network may have its own particular protocols, data fields that are employed in the respective messages, specific data format requirements, etc.

Figure 3:
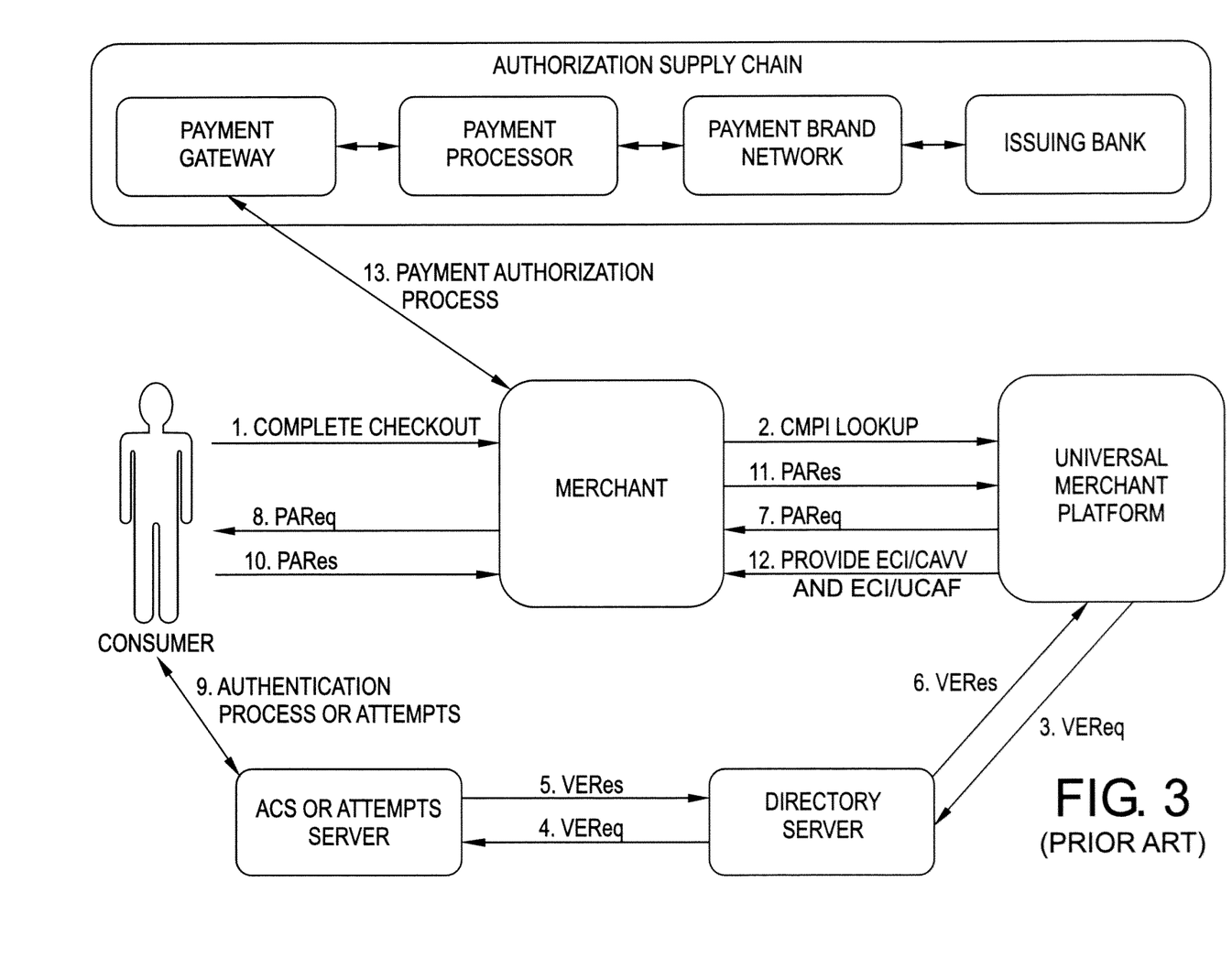
FIG. 3 is a schematic diagram of a payment process incorporating an authenticated payment program and a universal merchant platform.

To address some of these concerns, a universal merchant platform (UMP), shown in FIG. 3, may be employed. For detailed a detailed discussion regarding the universal merchant platform, refer, for example, to U.S. Pat. No. 7,051,002 entitled "Universal Merchant Platform for Payment Authentication" and U.S. Patent Publication No. 2006/0282382 entitled "Universal Merchant Platform for Payment Authentication," the disclosures of which are both incorporated herein by reference.

Generally, the UMP serves as a centralized merchant processing system for authenticated payments, allowing a merchant to securely and easily accommodate authentication of consumers in accordance with a variety of authentication programs implemented by payment brand networks, and to process electronic transactions through any payment network using a single platform. It also enables merchants to process these payments, regardless of which payment network they are to be routed through, with a single implementation. Moreover, it allows them or a funding source to use the established underlying payment processing infrastructure to process their credit and/or debit payment instruments at participating merchant sites.

While the UMP addresses some of the abovenoted concerns, there is still room for improvement. For example, known embodiments of the UMP are a "one size fits all solutions" in the sense that a merchant either employs an authenticated payment program or does not. Therefore, merchants run the risk of introducing an authenticated payment program in a way that could disrupt their current checkout process, even when employing known embodiments of the UMP.

The present invention contemplates a new and improved system and/or method which overcomes the above-referenced problems and others.

INCORPORATION BY REFERENCE

The following co-pending and commonly assigned applications, the disclosures of each being completely incorporated herein by reference, are mentioned:

U.S. Pat. No. 7,051,002 entitled "Universal Merchant Platform for Payment Authentication," by Keresman, III et al.; and, U.S. Patent Publication No. 2006/0282382 entitled entitled "Universal Merchant Platform for Payment Authentication," by Balasubramanian et al.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

In accordance with one aspect, a method and system are provided for supporting authentication processing of commercial transactions conducted over a communications network between consumers and merchants. Payment information for a commercial transaction between a consumer and a merchant is received over the communications network. The payment information identifies a payment instrument supporting an authenticated payment program. A determination is made as to whether to authenticate the consumer using the authenticated payment program based on authentication criteria defined by the merchant. The consumer is authenticated over the communications network in accordance with the authenticated payment program if authentication is determined to be appropriate based on the authentication criteria defined by the merchant.

In accordance with another aspect, a system for supporting authentication processing of commercial transactions conducted over a communications network between consumers and merchants. The system includes a universal merchant platform and a decision engine. The universal merchant platform provides the merchants, over the communications network, a common interface to one or more authenticated payment programs and includes merchant accounts for each of the merchants, wherein each of the merchant accounts include authentication criteria defined by a corresponding merchant. The decision engine determines whether to authenticate the consumers in accordance with the authenticated payment programs based on the authentication criteria defined by the merchants.

One advantage resides in the ability to cross reference data, even from rival payment brands or methods, to decide whether or not the consumer ought to go through an authentication step.

Another advantage resides in the ability to allow merchants to selectively authenticate their respective consumers.

Another advantage resides in the ability to authenticated payment programs in an intelligent fashion that does not completely disrupt current checkout processes.

Another advantage resides in the ability of merchants to receive all the benefits of authenticated payment programs as it relates to consumers they want to pin-point.

Another advantage resides in the ability to allow merchants to begin understanding authenticated payment programs, including those aspects pertaining to consumer behavior, data transmission to the processor, interchange qualifications, chargeback protection, and the like, in an organic way.

Another advantage resides in the ability to allow merchants to strategically deploy payment brands that suit their consumers' needs, while mitigating their own risk.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

Figure 4:
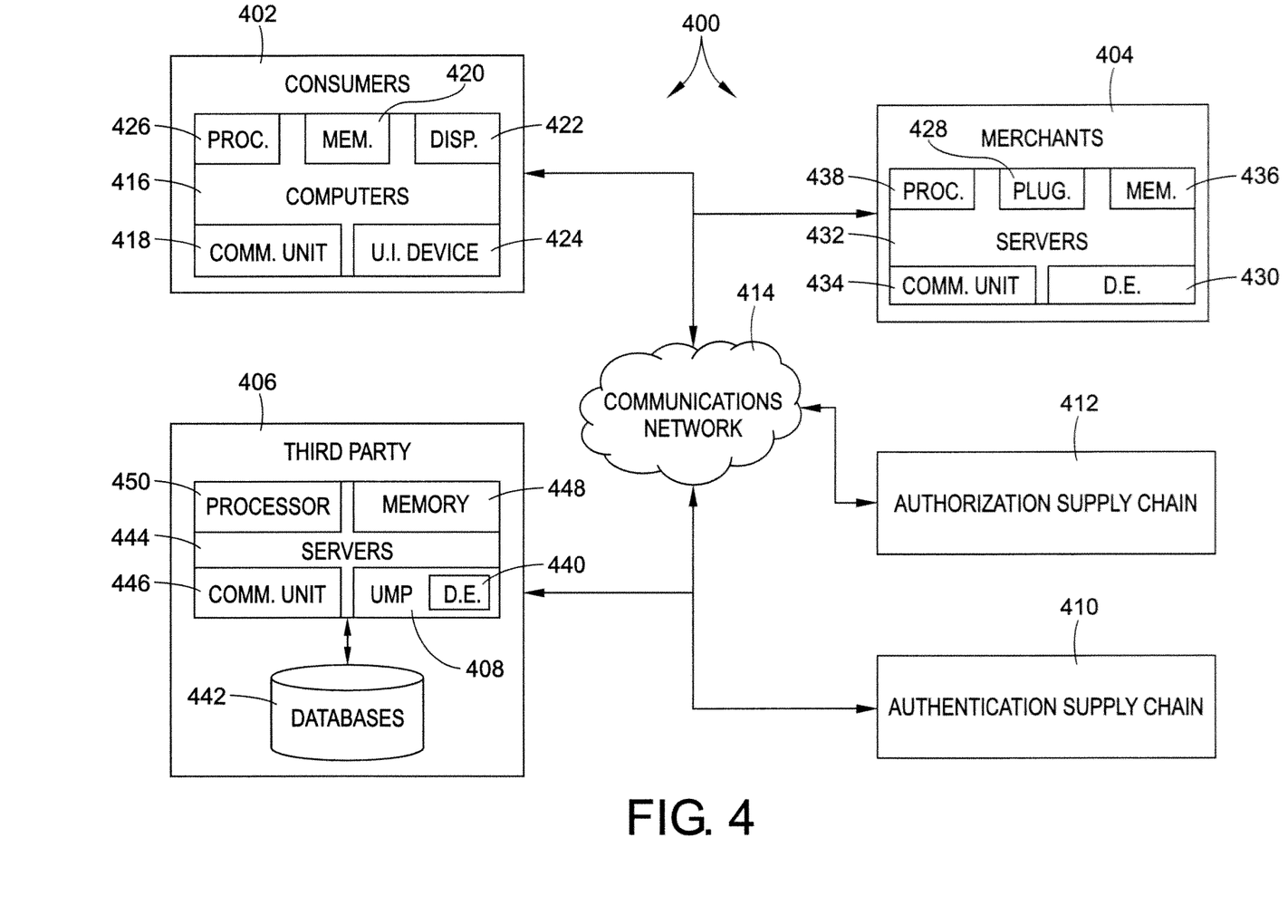
FIG. 4 is a block diagram of a payment processing system according to aspects of the present disclosure.

With reference to FIG. 4, a payment processing system 400 according to aspects of the present disclosure is provided. The system 400 suitably includes one or more consumers 402, one or merchants 404, an optional third party provider 406 of a universal merchant platform (UMP) 408, an authentication supply chain 410, an authorization supply chain 412, and the like, interconnected by a communications network 414. The communications network 414 is typically the Internet, but other communications networks are contemplated. For example, the communications network 414 may include one or more of a local area network, a wireless network, and the like.

The consumers 402 electronically purchase products and/or services from the merchants 404 over the communications network 414 via graphical user interfaces, such as e-commerce websites, of the merchants 404. Suitably, the consumers 402 employ web browsers to access the graphical user interfaces and purchase the products and/or services. However, it is to be appreciated that other means of electronically purchasing the products and/or services are contemplated. To purchase the products and/or services over the communications network 414, the consumers 402 submit payment information, directly or indirectly, to the merchants 404. As noted above, the payment information is submitted indirectly if information allowing identification of the payment information from another source is provided. The payment information suitably identifies a payment instrument, such as a card number and an expiration date. Further, the consumers 402 suitably employ payment instruments supporting authenticated payment programs. For example, one of the consumers 402 purchases a product and/or service from one of the merchants 404 using a Visa® credit card supporting Verified by Visa®.

Each of the consumers 402 is suitably embodied by a digital processing device 418, such as a computer, smart phone, PDA, and the like, connected to the communications network 416. Each of the digital processing devices 416 includes one or more of a communications unit 418, a memory 420, a display 422, a user input device 424, a processor 426, and the like. The communications units 418 allow the digital processing devices 416 to interact with other components connected to the communications network 414. The memories 420 include computer executable instructions for performing the abovenoted functions associated with the consumers 402. The displays 422 display the graphical user interfaces (e.g., via web browsers) facilitating consumer interaction with the digital processing devices 416. The user input devices 424 allow the consumers 402 to interact with the graphical user interfaces. The processors 426 execute the computer executable instructions on the memories 420.

The merchants 404 provide the consumers 402 the graphical user interfaces, suitably e-commerce websites, via the communications network 414. The graphical user interfaces suitably allow the consumers 402 to purchase products and/or services electronically over the communications network 414, which entails checking out and submitting payment information to the merchants 404. Payment information typically identifies at least a payment brand and a payment instrument. In certain embodiments, the UMP 408 is employed to select payment brands to present to the consumers 402 during check out, for example. When the merchants 404 receive the payment information from the consumers 402, the merchants 404 suitably, but not necessarily, employ the UMP 408 to partially or wholly complete the transaction. For example, the merchants 404 employ the UMP 408 for authentication. It is contemplated that UMP 408 may be employed by the merchants 404 to define when to authenticate the consumers 402, as described in detail below.

To use the UMP 408, each of the merchants 404 suitably registers with the third party provider 406. This includes the merchants 404 providing merchant information (e.g., financial information, physical address, category of good or services sold, Internet address, email address, authentication criteria, payment brand criteria, etc.) to the third party provider 406. As discussed below, the authentication criteria suitably define when the UMP 408 authenticates consumers for a merchant, and the payment brand criteria suitably define what payment brands are presented to the consumers of the merchant, as determined by the UMP 408. Typically, the merchant information is provided over the communications network 414 via a graphical user interface, such as a web interface, offered by the third party provider 406. However, other means of providing the merchant information, such as via a telephone, are contemplated. Additionally, the merchant information is suitably modifiable, optionally via the graphical user interface and/or the communications network 414. In certain embodiments, registration may further include signing and/or executing an agreement of the third party provider 406.

Further, to use the UMP 408, each of the merchants 404 suitably augments their graphical user interface to employ the UMP 408. For example, a merchant may add a hosted iFrame linking their graphical user interface to the third party provider 406. Advantageously, this allows easy integration with the UMP 408, especially for presenting allowed payment brands to the consumers 402.

Where the UMP 408 is not employed, the merchants 404 include plug-ins 428 and decision engines 430. The plug-ins 428 allow the merchants 404 to support authenticated payment programs and typically behave as the plug-in 216 of FIG. 2. The decision engines 430 allow the merchants 404 to selectively authenticate the consumers 402 based on one or more authentication factors and/or selectively present payment brands to the consumers 402 based on one or more payment brand factors. Advantageously, this allows the merchants 404 to strategically deploy payment brands that suit the consumers 402 needs, while mitigating their own risk. Another advantage resides in the ability to employ authenticated payment programs in an intelligent fashion that does not completely disrupt current checkout processes.

The authentication factors typically include one or more of the following:

1. Currency Amount: The merchants 404 can create thresholds on the transaction amounts they want to authenticate on. For example, a merchant may specify that they only want to authenticate transactions over $500.

2. Country Currency: The merchants 404 can pick and choose which currency or currencies they want to authenticate with. For example, a merchant can specify they only want to only authenticate consumers who are paying in Russian Rubles.

3. BIN (Bank Identification Number) Range: The merchants 404 can authenticate consumers attempting to complete a transaction with a card having a particular BIN number. A BIN number refers to the first 6 digits of a card and identifies bank name, country, and card type. For example, a merchant can specify they only want to authenticate cards from Bank of America® cardholders who are located in India and have debit cards. This is advantageous in that some countries, such as India, always require authentication.

4. Acquirer Merchant ID (MID): The merchants 404 can choose to authenticate for a particular MID associated with a transaction. An MID is provided to the merchants 404 by corresponding acquiring banks and a merchant may have more than one MID. For example, a merchant can specify they only want to authenticate transactions employing a particular MID.

5. Access Control Server (ACS) URL: The merchants 404 can choose whether to authenticate based on an ACS URL of the issuing bank or the bank's ACS provider. For example, a merchant may not want to perform authentication with banks who receive their ACS service from a certain ACS provider.

6. Enrollment/Registering during Shopping: The merchants 404 can choose to ask the consumers 402 to enroll in an authenticated payment program during the checkout process and authenticate the consumers 402 based upon this. For example, a merchant may not want to authenticate consumers who enrolled and/or registered during shopping.

7. Central Servers: Some payment brands, such as Visa®, operate a server that oversees bank performance in certain countries and/or regions, such as the United States. In some cases, the information received back from these servers does not fit merchants' needs or data managing capabilities, so the merchants 404 truncate this URL because of its length. According to this factor, the merchants 404 can choose not to authenticate cardholders who come under the surveillance of a central server system.

8. Billing and Shipping Information: The merchants 404 can choose to authenticate the consumers 402 based on associated billing and/or shipping information. For example, a merchant may not want to authenticate consumers who enter different billing and shipping information.

9. Attempts: A consumer goes through the attempts process if they have not enrolled their card in a payment program or the issuing bank is not participating in the payment program. The merchants 404 can choose whether to authenticate the consumers 402 based on whether they go through the attempts process.

10. ACS Performance: An authentication program may involve multiple third parties to enable accompanying protocols and/or processes. In certain embodiments, these third parties may be monitored and corresponding data logged to provide the merchants 404 the ability to tune-out and/or turn-off sub-performing third parties and/or any part of the network. For example, a merchant may not want to authenticate cardholders who belong to a bank with below average ACS performance.

11. Date and Time Frames: The merchants 404 can choose to authenticate during certain time periods throughout the day (e.g., EST, PST, and/or CST). For example, a merchant may only want to authenticate consumers who shop during the merchant's highest fraud time frame on 12/21 from 12:00 am EST to 3:00 am EST.

12. True A/B Test: The merchants 404 can perform tests on sets or batches of transactions with an authentication program on and then off. For example, a merchant may want to authenticate on every other transaction.

13. Consumer Shopped with Before: The merchants 404 can choose to authenticate based on whether the consumers 402 have previously shopped with the merchants 404, optionally, within a predetermined amount of time, such as the last 30 days. For example, a merchant may only want to offer authentication to consumers who have gone through the authentication process smoothly in the past 30 days. To identify a consumer, a card number is suitably employed. However, other information may be employed to identify a consumer, such as a phone number. In certain embodiments, information from previous transactions may also be employed. For example, if a consumer employed a different payment brand to complete a previous transaction, a merchant may choose to authenticate. Additionally or alternatively, in certain embodiments, where the UMP 408 is employed, information may be shared across the merchants 404. For example, if a consumer used a particular payment brand with a first merchant, a second merchant could use this information to determine whether to authenticate.

14. Consumer Shopped with Before and Authenticated: The merchants 404 can choose to authenticate based on whether the consumers 402 have previously shopped with the merchants 404 and successfully authenticated, optionally, within a predetermined amount of time, such as the last 30 days. For example, a merchant may only want to authenticate cardholders who have successfully authenticated in the past 30 days. To identify a consumer a card number is suitably employed. However, other information may be employed to identify a consumer, such as a phone number.

15. Abandonment of Transaction: The merchants 404 can choose to authenticate based on whether the consumers 402 previously abandoned transactions. In certain embodiments, the authentication decision may be based on when and/or how many previous transactions were abandoned. For example, a merchant may want to authenticate a consumer that abandoned a transaction within the last 30 days. In certain embodiments, where the UMP 408 is employed, information may be shared across the merchants 404.

16. Product Codes: The merchants 404 can choose to authenticate based on products codes. For example, a merchant can choose to authenticate all transactions involving products of a particular class, as identified by product codes.

The payment brand factors typically include one or more of the following:

1. Currency Amount: The merchants 404 can identify which payment brands they want to offer for transactions based on the transaction amounts. For example, a merchant may specify that they only want to allow a certain payment brand for transactions over $500.

2. Country Currency: The merchants 404 can pick and choose which payment brands they want to allow the consumers 402 to use based on currency or currencies. For example, a merchant can specify they only want to only want to allow consumers who are paying in Russian Rubles to use a certain payment brand.

3. Billing and Shipping Information: The merchants 404 can choose which payment brands to present to the consumers 402 based on billing and/or shipping information. For example, a merchant may not want to allow a consumer to pay with a certain payment brand if they enter different billing and shipping information.

4. Product Codes: The merchants 404 can choose what payment brands to allow based on products codes. For example, a merchant can choose to allow payment with a certain payment brand for all transactions involving products of a particular class, as identified by product codes.

5. IP Location: The merchants 404 can choose what payment brands to allow based on internet protocol (IP) location. For example, a merchant can choose to allow payment with a certain payment brand for all IP addresses associated with Russia.

6. Country: The merchants 404 can choose what payment brands to allow based on country. In certain embodiments, country is determined from the shipping information and/or the billing information. For example, a merchant can choose to allow payment with a certain payment brand for transactions shipped to Russia.

7. Repeat Payment Brand Consumers: The merchants 404 can choose what payment brands to present to the consumers 402 based on what payment brands the consumers 402 have successfully used for payment in the past. In certain embodiments, where the UMP 408 is employed, information may be shared across the merchants 404.

8. Date and Time Frames: The merchants 404 can choose what payment brands to allow during certain time periods throughout the day (e.g., EST, PST, and/or CST). For example, a merchant may only want to allow a certain payment brand during the merchant's highest fraud time frame on 12/21 from 12:00 am EST to 3:00 am EST.

9. True A/B Test: The merchants 404 can perform tests on sets or batches of transactions with different combinations of one or more payment brands. For example, a merchant may want to provide a particular combination of payment brands on every other transaction.

10. Risk Assessment: The merchants 404 can choose which payment brands to offer to the consumers 402 based on risk assessments of the consumers 402. For example, when a consumer is determined to be "high risk", a merchant can offer a payment brand where they assume no liability.

11. Fraud Score: The merchants 404 can choose which payment brands to offer to the consumers 402 based on fraud scores of the consumers 402. For example, a merchant may offer a particular payment brand if the fraud score of a consumer is within a certain range.

12. Consumer Shopped with Before: The merchants 404 may choose payment brands to present to the consumers 402 based on whether the consumers 402 have previously shopped with the merchants 404, optionally, within a predetermined amount of time, such as the last 30 days. For example, a merchant may only want to offer certain payment brands to consumers who have gone through the authentication process smoothly in the past 30 days. To identify a consumer, a card number is suitably employed. However, other information may be employed to identify a consumer, such as a phone number. In certain embodiments, information from previous transactions may also be employed. Additionally or alternatively, in certain embodiments, where the UMP, information may be shared across the merchants 404.

13. Consumer Shopped with Before and Authenticated: The merchants 404 may choose which payment brands to present to the consumers 402 based on whether the consumers 402 have previously shopped with the merchants 404 and successfully authenticated, optionally, within a predetermined amount of time, such as the last 30 days. For example, a merchant may only want to offer certain payment brands to consumers who have successfully authenticated in the past 30 days. To identify a consumer, a card number is suitably employed. However, other information may be employed to identify a consumer, such as a phone number.

14. BIN (Bank Identification Number) Range: The merchants 404 can choose which payment brands to present to the consumers 402 based on a provided BIN number. A BIN refers to the first 6 digits of a card and identifies bank name, country, and card type.

15. Authorization Result: The merchants 404 can choose what payment brands to present the consumers 402 after a transaction is denied authorization. For example, a merchant who is unable to accept a credit based transaction can display additional payment options after a transaction is denied authorization.

To allow the merchants 404 to selectively choose which of the consumers 402 to authenticate and/or which payment brands to offer to the consumers 402, the decision engines 430 allow the merchants 404 to establish authentication criteria and/or payment brand criteria using the foregoing factors. Suitably a graphical user interface is employed, optionally, accessible via the communications network 414. However, other means of defining the criteria are contemplated. For example, the telephone may be employed to define the criteria. It is contemplated that the criteria may be modified once generated. In certain embodiments, the merchants 404 may select from one or more predefined profiles of criteria rather than defining their own criteria.

The criteria are suitably defined using one or more rules, which match based on the factors, such as IP Location or Attempts, noted above. In certain embodiments, the factors may employ data collected from previous transactions (i.e., there may be a feedback loop). Additionally or alternatively, in certain embodiments, the priorities of the rules may be defined. For example, a rule specifying that authentication or a particularly payment brand should be employed for transactions employing Rubles may take priority over a rule specifying transactions less than $500 do not require authentication or may not use the particular payment brand.

A rule suitably includes match criteria and an action to perform if the match criteria are met. Depending upon whether the rule is being applied to authentication or payment brand, actions include enable or disable authentication or allow or disallow a defined set of one or more payment brands. It is contemplated that an action may be explicit or implicit. An action may be implicitly known if all defined rules or a grouping of rules are defined to perform the same action, such as enable authentication. To define the match criteria, Boolean logic based on the factors noted above is typically employed. However, it is to be understood that other approaches to defining the match criteria, such as fuzzy logic and/or thresholding weighted summations of the factors, may also be employed.

One or more servers 432 connected to the communications network 414 suitably embody each of the merchants 404. Each of the servers 432 includes one or more of a communications unit 434, a memory 436, a processor 438, and the like. The communications units 434 allow the servers 432 to interact with other components connected to the communications network 414. The memories 436 include computer executable instructions for performing the abovenoted functions associated with the merchants 404. The processors 438 execute the computer executable instructions on the memories 436. Further, in certain embodiments, the servers 432 include the plug-ins 428 and the decision engines 428. Suitably, the plug-ins 428 and the decision engines 430 are embodied by computer executable instructions stored on computer readable mediums, where the processors 438 execute the computer executable instructions. In some embodiments, the computer readable mediums may be the memories 436.

The third party provider 406 facilitates the completion of transactions between the consumers 402 and the merchants 404 by way of the UMP 408. As noted above, the third party provider 406 is not a necessary party to the system 100. Among other things, the UMP 408 provides the merchants 404 with a unified interface from which to carry out authenticated payment programs for different payment instruments, such as a credit cards and/or debits card. Advantageously, this allows the merchants 404 to offload the work involved with staying current with protocols associated with authenticated payment protocols and reduces the amount of resources the merchants 404 have to expend on implementing authenticated payment programs. In certain embodiments, the UMP 408 further allows the merchants 404 to employ the UMP 408 for settlement (i.e., the authorization and capture of funds) and/or payment brand selection.

The UMP 408 suitably includes a decision engine 440 allowing the merchants 404 to selectively authenticate the consumers 402 based on one or more authentication factors and/or selectively present payment brands to the consumers 402 based on one or more payment brand factors. Examples of these factors are described above. Advantageously, this allows the merchants 404 to strategically deploy payment brands that suit the consumers 402 needs, while mitigating their own risk. Another advantage resides in the ability to utilize authenticated payment programs in an intelligent fashion that does not completely disrupt current checkout processes. Suitably, the decision engine 440 employed by the UMP 408 includes the same functionality as the decision engines 430 employed by the merchants 404.

To use the UMP 408, each of the merchants 404 suitably registers with the third party provider 406. The merchant registration process begins with the third party provider 406 receiving merchant information (e.g., financial information, physical address, category of good or services sold, Internet address, email address, authentication criteria, payment brand criteria, etc.) from a merchant. The authentication criteria suitably define when the UMP 408 authenticates consumers for a merchant, and the payment brand criteria suitably define what payment brands are present to the consumers of the merchant, as determined by the UMP 408. Suitably, such information is collected via a graphical user interface, such as a web interface, via the communications network 414, but other means of collecting the information, such as via a telephone, are contemplated.

In certain embodiments, upon receiving the merchant information, the third party provider 406 evaluates the worthiness of the merchant for participation with the UMP 408. To evaluate the worthiness of the merchant, a predetermined or otherwise selected algorithm that acts on quantifiable values representing the merchant information is employed. In this manner, the merchant's credit worthiness may be determined and/or the merchant's reliability and/or reputation for customer service and sound business practice may be determined using objective, subjective, or a combination of objective and subjective criteria. Advantageously, the verification program ensures that the merchant is able to meet potential obligations. If the merchant is unworthy, a notification is suitably sent to the merchant and the merchant registration process ends.

Additionally or alternatively, in certain embodiments, a merchant agreement is forwarded to the merchant. It is contemplated that the merchant agreement is sent upon receiving the merchant information or, if an evaluation is performed, after a determination that the merchant is suitable for participation with the UMP 408. Suitably, the merchant agreement is sent to the merchant by way of the communications network 414, but other means are contemplated, such as by mail. The merchant agreement typically outlines the rights and responsibilities and/or duties of the merchant with respect to their participation in the UMP 408. After the merchant physically signs, electronically signs, or otherwise executes the merchant agreement, it is returned to the third party provider 406 by, for example, the communications network 414 or mail.

Upon receipt of the executed merchant agreement, or upon receipt of the merchant information if no merchant agreement is provided to the merchant, the third party provider 406 creates and maintains a record of one or more of the merchant information, the merchant's approval, the merchant agreement, and the like in one or more databases 442. In certain embodiments, the third party provider 406 further forwards to the merchant software and/or documentation as to how to integrate with the UMP 408, so as to allow the merchant to employ the UMP 408 with the consumers 402.

After registration with the third party provider 406, the merchant information, including the authentication criteria and/or the payment brand criteria, is suitably modifiable. Suitably, modification of the merchant information is performed via the communications network 414 using a graphical user interface similar to that used for registration. However, as above, other means of modifying the merchant information are contemplated. For example, the merchant information may be modified via the telephone.

One or more servers 444 connected to the communications network 414 suitably embody the third party provider 406. Each of the servers 444 includes one or more of a communications unit 446, a memory 448, a processor 450, and the like. The communications units 446 allow the servers 444 to interact with other components connected to the communications network 414. The memories 448 include computer executable instructions for performing the abovenoted functions associated with the third party provider 406. The processors 450 execute the computer executable instructions on the memories 448. Further, the servers 444 include the UMP 408. Suitably, the UMP 408 is embodied by computer executable instructions stored on computer readable mediums, where the computer executable instructions are executed by the processors 450. In some embodiments, the computer readable mediums may be the memories 448.

The authentication supply chain 410 facilitates authentication, which is typically conducted as described above in connection with FIG. 2. The authentication supply chain 410 suitably includes one or more directory servers, such as the directory server 218 of FIG. 2, and one or more access control servers (ACSs) and/or attempt servers, such as the ACS or attempts server 220. As noted above, the directory servers are employed to determine whether payment instruments are enrolled in an authenticated payment program and the URL to be used for authentication, and the ACSs authenticate the consumers 402. Attempt servers act as ACSs, even if authentication is not available due to lack of enrollment of the consumer and/or the issuer, allowing the authentication process to proceed. A payment brand network typically operates the directory servers and attempts servers. The issuer of a payment instrument typically operates an ACS for the payment instrument.

The authorization supply chain 412 facilitates settlement (i.e., authorization and capture of funds) after successful authentication. The authorization supply chain 412 typically includes an optional payment gateway, a payment processor (e.g., a merchant's financial institution or acquiring bank), a payment brand network (e.g., a credit card network), an issuing bank, and the like. In certain embodiments, merchants connect directly with the payment processor, whereby the payment gateway is optional. A traditional authorization process is illustrated in FIG. 1.

Figure 5:
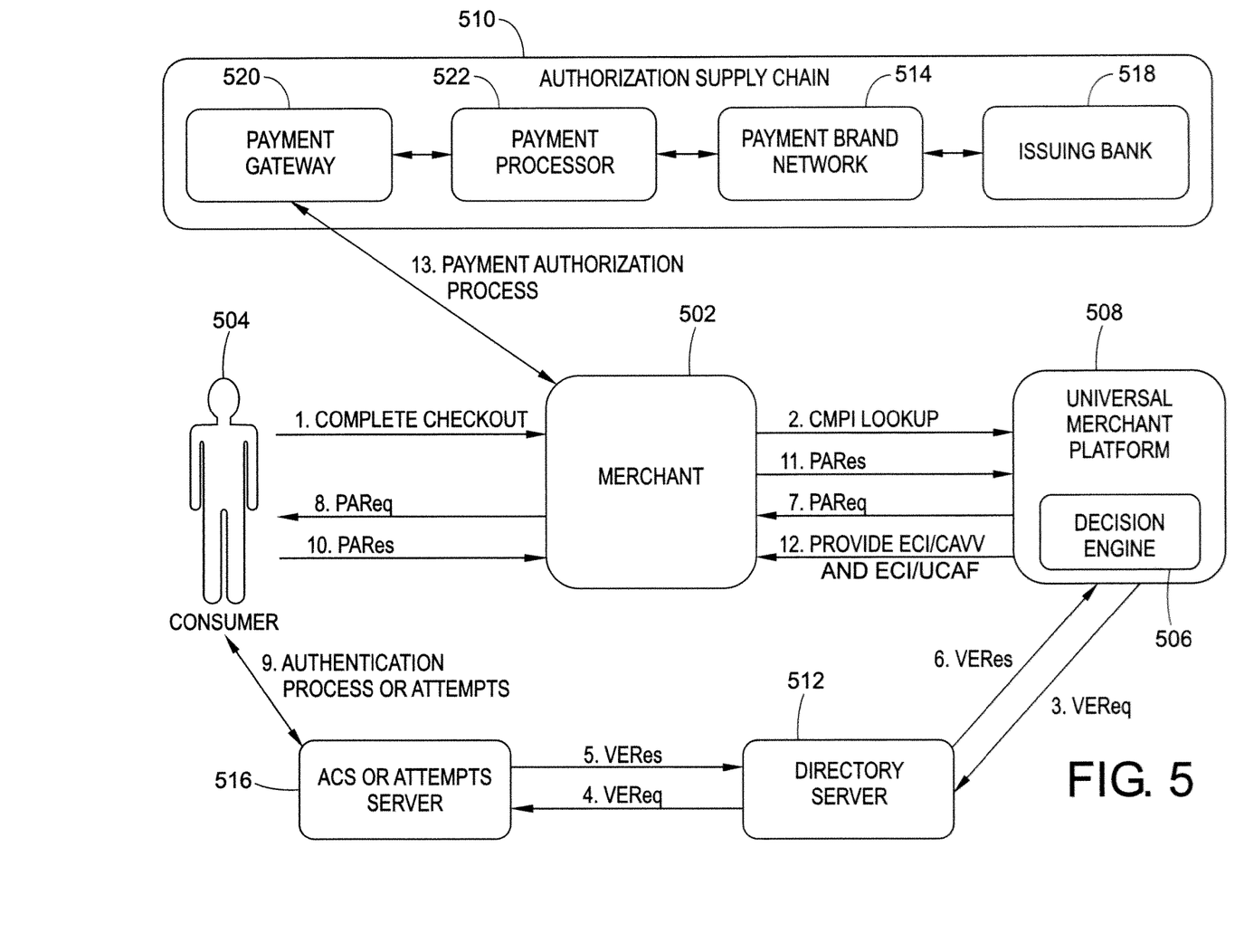
FIG. 5 is a schematic diagram of a payment process incorporating an authenticated payment program and a universal merchant platform, along with an decision engine, in accordance with aspects of the present disclosure; and, FIG. 6 is a schematic diagram of a payment process incorporating an authenticated payment program, along with a decision engine, in accordance with aspects of the present disclosure.

With reference to FIG. 5, a schematic diagram of an embodiment of a payment process incorporating an authenticated payment program is provided. After browsing a graphical user interface, such as an e-commerce website, of a merchant 502 and selecting products and/or services to purchase, a consumer 504 completes a checkout process in which they provide the merchant 502 with payment information. To do so, the consumer 504 enters the payment information, or at least enough information to identify and/or locate the payment information, on one or more checkout pages of the graphical user interface. As noted above, the payment information typically identifies a payment brand and a payment instrument corresponding to the payment brand. In certain embodiments, a decision engine 506 of a universal merchant platform (UMP) 508, as described above, determines which payment brands are allowed. For example, the checkout pages may include an iFrame linking to the UMP 508 for identifying the payment brand and/or the payment instrument.

After receiving the payment information from the consumer 504, the merchant 502 performs a CMPI lookup request to the UMP 508. Such a request typically includes the payment information collected from the consumer 504. Based on this information, the UMP 508 determines whether authentication is appropriate using the decision engine 506, as described above, and/or instantiates a merchant plug-in for the pending transaction between the consumer 504 and the merchant 502. Insofar as authentication is determined to be inappropriate, the merchant 502 is notified thereof (not shown) and traditional settlement processes are carried. Suitably, the merchant 502 performs settlement via an authorization supply chain 510, but it is contemplated that the UMP 508 performs settlement via the authorization supply chain 510 on behalf of the merchant 502. Insofar as authentication is determined to be appropriate, the merchant plug-in proceeds to authenticate the consumer 504.

Authentication typically, but not necessarily, includes the merchant plug-in generating a VEReq message and providing it to a directory server 512 maintained by a payment brand network 514 of the payment instrument. The directory server 512 then passes the VEReq message to an ACS or attempts server 516 typically maintained by the payment brand network 514 or an issuing bank 518 of the payment instrument, depending upon whether the ACS or attempts server 516 is an ACS or an attempts server. The ACS or attempts server 516 generates a VERes message and provides the VERes message to the directory server 512 in response to the VEReq message, which the directory server 512 then returns to the UMP 508. Insofar as enrollment verification succeeds, the UMP 508 generates a PAReq message and provides the merchant 502 with the PAReq message. The merchant 502, in turn, provides the message to the consumer 504 and the consumer 504 directly authenticates, if appropriate, with the ACS or attempts server 516. Thereafter, the consumer 502 returns a PARes message to the merchant 502, which is passed to the UMP 508. The UMP 508 extracts the ECI/CAAV and/or the ECI/UCAF from the PARes message and verifies the same. The ECI/CAAV and/or ECI/UCAF are typically provided to the merchant 502 next.

Once authentication is completed, assuming it is successful, settlement is carried out in which the funds for products and/or services of the transaction are transferred from the consumer 504 to the merchant 502. Typically, this is performed using the authorization supply chain 510, which typically includes an optional payment gateway 520, a payment processor 522, the payment brand network 514, and the issuing bank 518. As discussed above, the payment gateway 520 is optional in that the merchant 502 can directly connect with the payment processor 522. Suitably, the merchant 502 performs the settlement process, as illustrated, but the UMP 508 may alternatively perform the settlement process.

Figure 6:
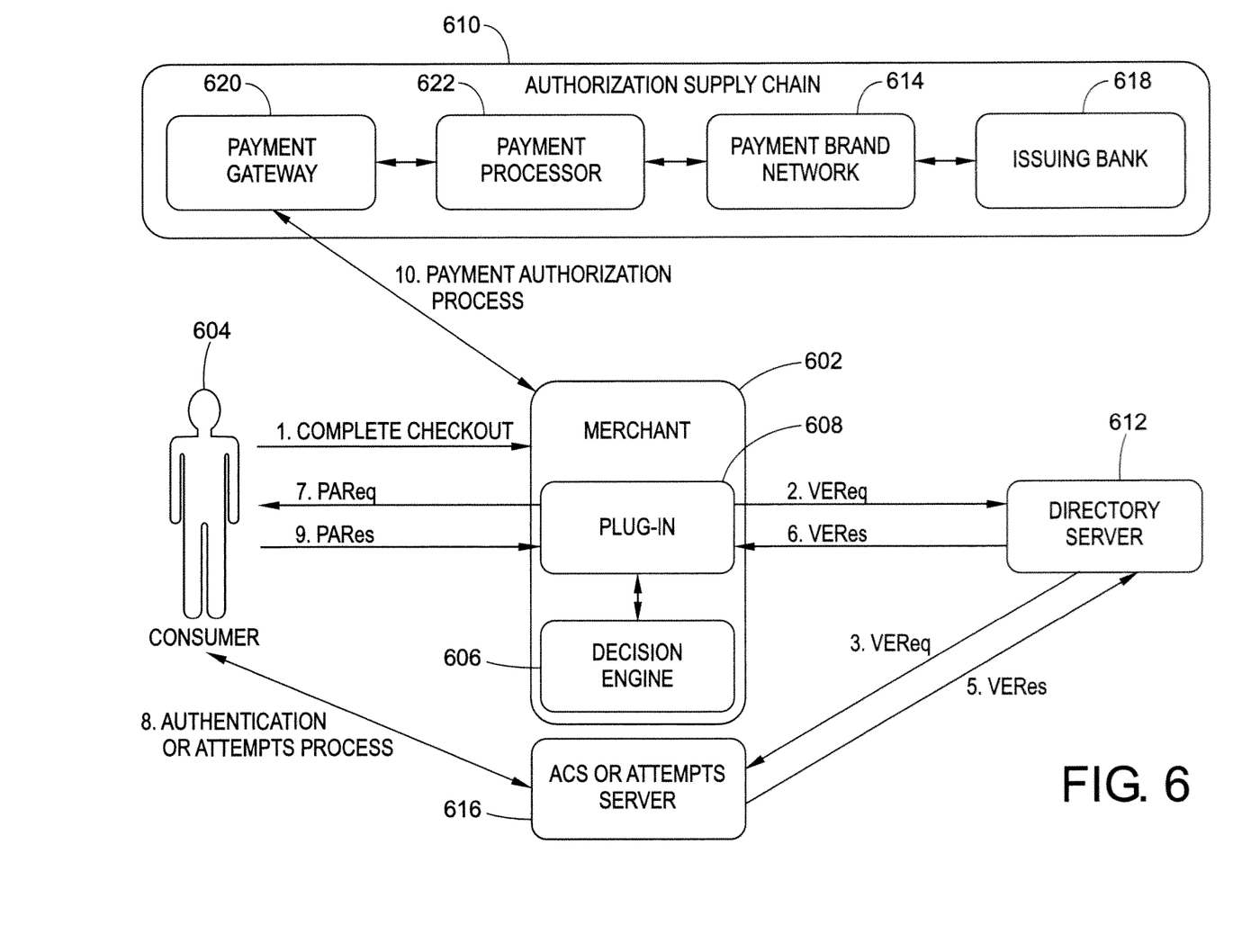

With reference to FIG. 6, a schematic diagram of an embodiment of a payment process incorporating an authenticated payment program is provided. After browsing a graphical user interface, such as an e-commerce website, of a merchant 602 and selecting products and/or services to purchase, a consumer 604 completes a checkout process in which they provide the merchant 602 with payment information. To do so, the consumer 604 enters the payment information, or at least enough information to identify and/or locate the payment information, on one or more checkout pages of the graphical user interface. As noted above, the payment information typically identifies a payment brand and a payment instrument corresponding to the payment brand. In certain embodiments, a decision engine 606 of the merchant 602, as described above, determines which payment brands are allowed.

After receiving the payment information from the consumer 604, the merchant 602 determines whether authentication is appropriate using the decision engine 606, as described above, and/or instantiates a plug-in 608 for the pending transaction between the consumer 604 and the merchant 602. Insofar as authentication is determined to be inappropriate, the merchant 602 carries out traditional settlement processes suitably via an authorization supply chain 610. Insofar as authentication is determined to be appropriate, the merchant plug-in proceeds to authenticate the consumer 504.

Authentication typically, but not necessarily, includes the plug-in 608 generating a VEReq message and providing it to a directory server 612 maintained by a payment brand network 614 of the payment instrument. The directory server 612 then passes the VEReq message to an ACS or attempts server 616 typically maintained by the payment brand network 614 or an issuing bank 618 of the payment instrument, depending upon whether the ACS or attempts server 616 is an ACS or an attempts server. The ACS or attempts server 616 generates a VERes message and provides the VERes message to the directory server 612 in response to the VEReq message, which the directory server 612 then returns to the plug-in 608. Insofar as enrollment verification succeeds, the plug-in 608 generates a PAReq message and provides the merchant 602 with the PAReq message. The merchant 602, in turn, provides the message to the consumer 604 and the consumer directly authenticates, if appropriate, with the ACS or attempts server 616. Thereafter, the consumer 604 returns a PARes message to the merchant 602, which is passed to the plug-in 608. The plug-in 608 extracts the ECI/CAAV and/or the ECI/UCAF from the PARes message and verifies the same.

Once authentication is completed, assuming it is successful, settlement is carried out in which the funds for products and/or services of the transaction are transferred from the consumer 604 to the merchant 602. Typically, this is performed using the authorization supply chain 610, which typically includes an optional payment gateway 620, a payment processor 622, the payment brand network 614, and the issuing bank 618. As discussed above, the payment gateway 620 is optional in that the merchant 602 can directly connect with the payment processor 622.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Even more, it is to be appreciated that, as used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a controller includes one or more of a microprocessor, a microcontroller, a graphic processing unit (GPU), an application-specific integrated circuit (ASIC), a field-programmable gate array (FPGA), and the like; a communications network includes one or more of the Internet, a local area network, a wide area network, a wireless network, a wired network, a cellular network, a data bus, such as USB and I2C, and the like; a user input device includes one or more of a mouse, a keyboard, a touch screen display, one or more buttons, one or more switches, one or more toggles, and the like; and a display includes one or more of a LCD display, an LED display, a plasma display, a projection display, a touch screen display, and the like.

In short, the present specification has been set forth with reference to preferred embodiments. Obviously, modifications and alterations will occur to others upon reading and understanding the present specification. For example, the decision engines 430, 440 may be employed for more than authentication and/or payment brand selection, such as rejecting transactions. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. A method of supporting authentication processing of commercial transactions conducted over a communications network between consumers and merchants, said method comprising:
   receiving, by at least one processor, one or more payment brand criteria including payment brand rules from a merchant;
   receiving, by the at least one processor, authentication criteria from the merchant;
   ranking, by the at least one processor, the payment brand rules in order of priority;
   determining, by the at least one processor and based on the ranked payment brand rules, one or more payment brands of a plurality of payment brands that a consumer is allowed to use for completing a commercial transaction;
   transmitting, by the at least one processor and to a device of the consumer over the communications network, a graphical user interface comprising the one or more payment brands of the plurality of payment brands that the consumer is allowed to use for completing the commercial transaction;
   receiving, by the at least one processor and from the device of the consumer, via the graphical user interface over the communications network, a selection of a payment brand of the one or more payment brands and payment information of a payment instrument associated with the selected payment brand;
   over the communications network;
   determining, by the at least one processor, to authenticate the consumer using an authentication program associated with the selected payment brand of the payment instrument after receiving the payment information,
   wherein determining to authenticate the consumer comprises:
      comparing the authentication criteria from the merchant to performance information of an access control server associated with an issuing financial institution of an account of the consumer associated with the payment instrument and determining that the performance information of the access control server associated with the issuing financial institution satisfies the authentication criteria from the merchant;
      comparing the authentication criteria from the merchant to information associated with a different payment brand than the selected payment brand of the payment instrument and determining that the information associated with the different payment brand satisfies the authentication criteria from the merchant; and
      comparing the authentication criteria from the merchant to information identifying the payment instrument associated with the account of the consumer and determining that the information identifying the payment instrument associated with the account of the consumer satisfies the authentication criteria from the merchant; and
   in response to determining to authenticate the consumer using the authentication program, instantiating, with the at least one processor, a plug-in for authenticating the consumer based on the received payment information for the commercial transaction that identifies the payment instrument associated with the one or more payment brands;
   in response to determining to authenticate the consumer using the authentication program, authenticating, by the at least one processor, the consumer over the communications network in accordance with the authentication program, wherein authenticating the consumer over the communications network comprises:
      generating, by the at least one processor and via the plug-in, a verify enrollment request (VEReq) message based on determining to authenticate the consumer,
      providing, by the at least one processor and via the plug-in, the VEReq message to a server of a payment brand network associated with the payment brand of the payment instrument,
      receiving, by the at least one processor and via the plug-in, a verify enrollment response (VERes) message from the server of the payment brand network associated with the payment brand of the payment instrument,
      generating, by the at least one processor and via the plug-in, a payer authentication request (PAReq) message based on receiving the VERes message from the server of the payment brand network associated with the payment brand of the payment instrument,
      providing, by the at least one processor and via the plug-in, the PAReq message to the consumer;
      receiving, by the at least one processor and via the plug-in, a payer authentication response (PARes) message from the consumer;
      determining, by the at least one processor and via the plug-in, that the PARes message indicates that the consumer is authenticated for the commercial transaction; and
   in response to authenticating the consumer over the communications network, performing a settlement process for the commercial transaction based on the received payment information for the commercial transaction that identifies the payment instrument associated with the one or more payment brands.

2. The method according to claim 1, further including:
   receiving second payment information for a second commercial transaction between a second consumer and the merchant over the communications network, wherein the second payment information identifies a second payment instrument supporting a second authentication program;
   determining whether to authenticate the second consumer using the second authentication program and based on second authentication criteria from the merchant; and,
   in response to determining to authenticate the second consumer, authenticating the second consumer over the communications network in accordance with the second authentication program.

3. The method according to claim 1, wherein the authentication criteria include one or more authentication rules, said method further including: ranking the authentication rules in order of priority.

4. The method according to claim 1, wherein determining to authenticate the consumer as part of the commercial transaction using the authentication program includes:
   comparing the authentication criteria to country currency of the commercial transaction and determining that the country currency of the commercial transaction satisfies the authentication criteria from the merchant;

comparing the authentication criteria to information identifying whether the consumer enrolled or registered in the authentication program and determining that the information identifying whether the consumer enrolled or registered in the authentication program satisfies the authentication criteria from the merchant;

comparing the authentication criteria to information identifying whether the consumer both shopped with the merchant and was authenticated with the merchant and determining that the information identifying whether the consumer both shopped with the merchant and was authenticated with the merchant satisfies the authentication criteria from the merchant;

comparing the authentication criteria to information identifying whether the consumer previously abandoned a commercial transaction and determining that the information identifying whether the consumer previously abandoned a commercial transaction satisfies the authentication criteria from the merchant; and comparing the authentication criteria to product codes of the commercial transaction and determining that the product codes of the commercial transaction satisfy the authentication criteria from the merchant.

5. The method according to claim 1, wherein determining to authenticate the consumer as part of the commercial transaction using the authentication program includes:

comparing the authentication criteria to an acquirer merchant ID (MID) of the merchant and determining that the acquirer MID of the merchant satisfies the authentication criteria from the merchant;

comparing the authentication criteria to information identifying whether the consumer has enrolled the payment instrument in a payment program and determining whether the information identifying that the consumer has enrolled the payment instrument in the payment program satisfies the authentication criteria from the merchant; and comparing the authentication criteria to information identifying whether the financial institution that issued the payment instrument is participating in the payment program and determining that the information identifying whether the issuing bank of the payment instrument is participating in the payment program satisfies the authentication criteria from the merchant.

6. The method according to claim 1, wherein the payment brand rules include a rule that a particular payment brand should be used for a particular country currency; and wherein determining the one or more payment brands of the plurality of payment brands that the consumer is allowed to use for completing the commercial transaction comprises:

determining the one or more payment brands of the plurality of payment brands that a consumer is allowed to use for completing the commercial transaction based on the payment brand rules that include the rule that the particular payment brand should be used for the particular country currency.

7. The method according to claim 6, wherein the payment brand rules include a rule that transactions less than a predetermined currency amount may not use the particular payment brand; and wherein determining the one or more payment brands of the plurality of payment brands that the consumer is allowed to use for completing the commercial transaction comprises:

determining the one or more payment brands of the plurality of payment brands that a consumer is allowed to use for completing the commercial transaction based on the payment brand rules include the rule that transactions less than the predetermined currency amount may not use the particular payment brand.

8. The method according to claim 7, further including ranking the rule that the particular payment brand should be used for the particular country currency with a higher priority than the rule that transactions less than the predetermined currency amount may not use the particular payment brand.

9. The method according to claim 1, wherein the authentication criteria is defined using authentication factors, and wherein the method further includes:

extracting the authentication factors directly from information identifying a payment instrument, information from other merchants, and historical information; and wherein determining to authenticate the consumer as part of the commercial transaction comprises:

determining to authenticate the consumer by comparing the authentication criteria to the extracted authentication factors.

* * * * *